United States Patent [19]

Beeferman et al.

[11] Patent Number: 5,340,012

[45] Date of Patent: Aug. 23, 1994

[54] TITANIUM HYDRIDE COATED BRAZING PRODUCT

[75] Inventors: Dennis Beeferman, Brookfield; William F. Lucas, Oak Creek, both of Wis.

[73] Assignee: Handy & Harman, New York, N.Y.

[21] Appl. No.: 39,309

[22] Filed: Apr. 15, 1993

Related U.S. Application Data

[63] Continuation-in-part of Ser. No. 746,266, Aug. 15, 1991, Pat. No. 5,186,380.

[51] Int. Cl.$^5$ .................. B23K 35/24; B23K 35/34
[52] U.S. Cl. .................. 228/56.3; 228/124.5
[58] Field of Search .................. 228/56.3, 122.1, 124.5, 228/246, 248.1; 148/24

[56] References Cited

U.S. PATENT DOCUMENTS

| | | | |
|---|---|---|---|
| 2,570,248 | 10/1951 | Kelley | 228/121 |
| 2,857,663 | 10/1958 | Beggs | 228/263.12 |
| 3,915,369 | 10/1975 | Schmidt-Brucken et al. | 228/198 |
| 4,426,033 | 1/1984 | Mizuhara | 228/56 |
| 4,448,853 | 5/1984 | Fischer et al. | 428/607 |
| 4,624,897 | 11/1986 | Ito | 428/432 |
| 4,684,579 | 8/1987 | Mizuhara | 228/122 |
| 4,729,504 | 3/1988 | Edamura | 228/122 |
| 4,835,344 | 5/1989 | Iyogi et al. | 228/122 |
| 4,901,904 | 2/1990 | Tsuno | 228/56.3 |
| 4,917,642 | 4/1990 | Nakahashi et al. | 228/122 |
| 4,924,033 | 5/1990 | Iyogi et al. | 228/122 |
| 4,961,529 | 10/1990 | Gottselig et al. | 228/122 |

OTHER PUBLICATIONS

Search Report.
Article—"Active Metal Brazing" by Norm Anderson.
Product Bulletin—CUSIL ABA—from Wescgo.
Article—"Ceramic-to-Metal Joining with Active Brazing Filler Metal" form Weldeng Journal, Oct. 1985, pp. 27–32.
Product Bulletin—Properties of Incusil ABA—from Wesgo.
Article—"Joining Ceramic to Metal with Ductile Active Filler Metal" from Welding Journal, Oct. 1986.
Product Bulletin—Lucanex Brazing Pastes—from Lucas-Melhaupt, Inc.
Article—"Vaccum Brazing Ceramics to Metals" from Advanced Materials processes—Feb. 1987.
Technical Data Sheet-Lucanex Brazing Pastes.
Article—"High-Reliability Joining of Ceramic of Metal" from Westgo-Div., GTE Product Corp., by Mizuhara, et al.
Product Bulletin—Brazing/Soldering Filler Metals from Lucas Milhaupt.
Article—"Wetting Strength Properties of Ceramic to Metal Joints with Active Filler Metals Depending on Brazing Conditions and Joint Geometry" from Degussa-Metz Metallurgical Corp., by Weise, et al.

*Primary Examiner*—Samuel M. Heinrich
*Attorney, Agent, or Firm*—Pennie & Edmonds

[57] ABSTRACT

A one step ceramic brazing material preferably for use in joining ceramics to each other or in joining a ceramic to a metal. The brazing material includes a strip of a metal of alloy and greater than 3% titanium or titanium hydride in powder form, in a polymer coating thereon, to enhance the wettability of the braze metal onto ceramics and metals. The brazing material is made in the form of a coated strip so that it can be stamped to washers rings or discs for particular applications.

18 Claims, No Drawings

TITANIUM HYDRIDE COATED BRAZING PRODUCT

CROSS REFERENCE TO RELATED APPLICATIONS

This application is a continuation-in-part of U.S. application Ser. No. 07/746,266, filed Aug. 15, 1991, now U.S. Pat. No. 5,186,380.

TECHNICAL FIELD

The present invention relates to new brazing products which may be utilized in a variety of brazing applications, including the joining of different materials, such as ceramics to metals, as well as the joining of other materials which are difficult to braze.

BACKGROUND OF THE ART

Ceramic materials are often utilized in applications requiring the joining of such materials to either other ceramic materials or to metal components. In the electronics industry, vacuum tube production has utilized such ceramic to metal joints, and currently cesium vapor arc lamps utilize brazed ceramic to metal end cap seals. In the automotive industry, ceramic is utilized in wear pads which are joined to metal parts to prolong the service life of such parts.

In the past, a two step technique for brazing ceramic materials to metal components was utilized. A molybdenum/manganese paint was first applied to the ceramic substrate to be joined. The molybdenum/manganese painted surface would then be plated with nickel. The metallized surface of the ceramic would then be brazed to the desired metal component with a suitable brazing compound. The process was highly time consuming and required metallization at extremely high temperatures on the order of approximately 1500° C. Metallization of the ceramic material was required due to the inability of brazing compounds of the past to sufficiently wet out onto the ceramic material.

In the 1940's, development of active metal brazing of ceramics began. In essence, active metal brazing allows a direct brazing of a ceramic component without the need for a prior metallization step. An active component in the brazing filler chemically reacts with the ceramic to form an interfacial compound. The active component in the brazing filler may be titanium, zirconium, columbium, nobelium, vanadium or chromium. Within the interfacial compound, displaced ceramic cations from the ceramic material migrate into the filler. Most commonly, active brazing compounds are based on binary or ternary metal systems in which at least one metal is the active metal as discussed above.

U.S. Pat. No. 2,570,248 discloses a mixture of titanium hydride ($TiH_2$) and a powdered braze alloy, such as a copper alloy for use in bonding "non-metallic bodies" such as ceramics, porcelains, glasses, carbons, and diamonds, to other non-metallic bodies or to metal components.

The titanium component of this mixture is the active metal component that allows direct brazing to the ceramic material. When utilizing a ceramic material such as $Al_2O_3$, the reaction that takes place between an active brazing filler component such as titanium can be represented as:

$$3(Ti) + 2 Al_2O_3 \rightarrow 3 TIO_2 + 4 (Al)$$

The aluminum cations are free to move into the braze filler metal as the titanium oxide in the interfacial compound provides the wetting of the ceramic surface which had previously been accomplished with the two step metallization process described before.

The process of this patent suffers from certain inherent deficiencies. The coating material includes a mixture of titanium hydride and a copper, silver or gold based braze alloy. The coating is applied by a painting technique wherein irregularities in coating thickness and coverage often occur. These irregularities lead to localized weakness in joint strength as well as to evaporation of the braze alloy. Furthermore, when such coating materials are utilized to join ceramics in a vacuum, the hydrogen liberated from the titanium hydride must be removed requiring additional pumping off of such gas.

U.S. Pat. No. 2,857,663 discloses a technique for bonding ceramic materials to other ceramic materials or to metals wherein a shim, often a thin foil, is placed between the ceramic and the component to which it is to be joined. The foil is comprised of at least one metal of the titanium group (the active metal) and an alloying metal such as copper, nickel, molybdenum, platinum, cobalt, chromium or iron. The alloying metal may be selected so as to form a eutectic alloy at a temperature below the melting temperature of any one of the alloying metals. The titanium group includes metals in group IVb of the standard periodic table, such as titanium, zirconium, hafnium, and thorium.

The foil technique utilized in this patent allowed a uniform application of alloy and active metal between the components to be joined. Additionally, since the hydride form of titanium was not utilized, there would be no hydrogen gas to remove from the reaction atmosphere.

In an effort to simplify the art of joining ceramic components to other parts, brazing alloys have been formulated which incorporate up to about 2.5 % titanium in a eutectic mixture of copper and silver. As discussed above, it is the titanium group metal that is active in wetting the surface of the ceramic. There must be provided within the brazing filler a sufficient quantity of titanium to react with the ceramic so as to form a substantial interfacial layer. Yet, in alloys presently available, there is a functional limit upon the amount of titanium group active metal which may be utilized.

Brazing alloys are subject to a phenomenon known as blushing. As a brazing alloy is heated, surface flow of the filler metal may occur. As the surface flow of the filler metal increases, depletion of the active metal component occurs- This causes a depletion in the amount of active metal available for reaction with the ceramic so as to form the interfacial compound. A decrease in the interfacial compound results in a weaker bond between ceramic or ceramic/metal components joined by such brazing alloys. Brazing materials presently available containing titanium or titanium in an amount above about 2.5% lead to increased blushing with the concomitant loss of joint strength.

INCUSIL-ABA ® brazing material, a product of the Wesco Division of GTE Products Corporation, is typical of the brazing alloys presently available utilizing titanium as an alloy component. The recommended brazing temperature of this alloy is from 715°–740° C. After the brazed components are heated to this temperature, they are cooled at a controlled rate. It is well known that the ceramics have a coefficient of thermal expansion substantially lower than that of metallic materials. One of the major difficulties in attaining a brazed joint of sufficient strength between these materials concerns the high stress generated when the ceramic/metal structure cools after brazing- If this stress is not relieved, or if not redirected so as to strengthen the bond, joint failure will result.

The degree of plasticity a particular brazing alloy provides is one way in which the stress resulting from joint cooling may be alleviated- As the titanium content of a brazing alloy exceeds above about 2—3 weight percent, a hardening of the brazing alloy occurs so as to limit its capability of reducing joint structural stress as discussed above. Furthermore, it is often desirable to extrude a brazing alloy so as to form a sheet which may be cut into washers, rings or other shapes in accordance with joint configuration. The increase of titanium content, as discussed above, will increase alloy brittleness so as to make such extrusion and cutting procedures highly difficult.

The one step solid alloy brazing materials currently available are limited, in that such materials may incorporate only about 2 to 3 weight percent of a titanium group active metal, and this does not provide for optimum brazed ceramic joints. What is needed, therefore, is a one step brazing material that may be extruded into sheets and cut into various shapes wherein an optimum amount of titanium group active metal is provided in the material to ensure that a brazed joint of optimum quality is achieved.

SUMMARY OF THE INVENTION

A one step brazing product for joining ceramics to ceramics or metals has now been formulated which overcomes the deficiencies of the prior art. This brazing product may be extruded into sheets and cut into various shapes which conform to the shape of the desired joint.

This brazing product comprises an article of a filler metal of at least one and preferably two or more metals for forming a braze joint when heated to an appropriate brazing temperature, and a coating upon at least a portion of the article. The coating includes an activating agent of a Group IVb transition metal or transition metal hydride in powder form and a binder for retaining the transition metal or hydride upon the alloy article.

The Group IV transition metal or hydride is preferably titanium, zirconium or mixtures thereof in powder form. These agents activate many different base materials so that the filler metal alloy will bond thereto. In particular, these components activate ceramics, diamonds, gemstones and other difficult to wet materials. They are also useful for activating stainless steel or other metals or alloys which form surface oxides that would otherwise interfere with filler metal bonding- Surprisingly, these hydrides are also useful in activating strong metal oxide forming metals, such as aluminum.

Another embodiment of the invention relates to a method for joining a first material to a second material using the brazing products described herein by placing the above-described brazing product adjacent or between the first and second materials and heating those materials to an appropriate temperature for forming a braze joint. The activating agent facilitates bonding to the first and second materials by forming an interfacial compound therewith which enables bonding thereto by the melted filler metal. Thus, the present invention includes a one-step method which greatly simplifies and improves upon prior art techniques.

DETAILED DESCRIPTION OF THE INVENTION

The preferred brazing product of this invention utilizes a strip of a metal alloy as the filler metal. A conventional braze alloy which is desirable from a melting temperature standpoint is the silver-copper eutectic composition of 72% silver and 28% copper, optionally containing a small amount of lithium (up to 0.5% by weight based on the weight of the silver and copper). Other preferred alloys include Premabraze 616, Braze 716 and Braze 721, each available from Lucas-Milhaupt, Inc., Cudahy, Wis. Other suitable silver-copper alloys include from about 60 to 85 weight percent silver, and from about 15 to 40 weight percent copper.

The present invention may alternately include alloys of silver-copper-nickel, or silver-copper-indium. The silver-copper-nickel alloys comprise from about 60 to 85 weight percent silver, from 15 to 40 weight percent copper and from about 0.2 to 2.5 weight percent nickel, while the silver-copper-indium alloys comprise from about 50 to 70 weight percent silver, from about 15 to 35 weight percent copper, and from about 10 to 20 weight percent indium. The eutectic alloys of these metals can be used when the lowest braze temperatures are desired.

In addition, a wide range of other conventional filler alloys can be included when the invention is to be used for joining similar or dissimilar base materials or components. Alloys containing copper, zinc, nickel, cadmium, tin, silver, gold, molybdenum, cobalt, or palladium, along with additives such as silicon, phosphorus, boron or the like are suitable.

The METGLAS nickel base materials (products of Allied Corp., Morristown, N.J. and gold-nickel alloys (82/18) are specific examples of additional braze materials, although these have higher melting temperatures than the silver-copper alloys mentioned above.

These alloys can be used as a single strip or layer, or as a "sandwich" (one or two layers adjacent a copper or nickel strip or core). A variety of "sandwich" products are available from Handy & Harman under the tradename TRIMET. The alloy is generally made in the form of a thin strip having a width of between 0.02 and 2" (or more if desired) and a thickness of 0.001 to 0.25". When thicker strips are desired, the tri-layer "sandwich" construction, wherein two outer layers of the filler metal alloy are placed about an inner copper or nickel layer, is advantageous.

The outer layers of this alloy in the form of strip are rolled onto each side of the layer of copper or nickel. The rolling is completed until the thickness of the clad layer is about 0.0025 inch for each of the two outerlayers and 0.005 inch for the pure copper core. Thus, the overall thickness of this tri-layer braze product is approximately 0.01 inches. This product is then cut to conform to the shape of the joint and placed between the materials which are to be joined.

It has also been found that aluminum or aluminum alloys can be joined using an aluminum alloy 718 strip which includes an activating agent of a Group IVb transition metal or transition metal hydride in powder form and a binder for retaining the transition metal or hydride upon the alloy strip. The 718 alloy is 88% aluminum and 12% silicon. For example, this strip can be stamped into washers and used to braze aluminum alloys together, because the activating agent can penetrate of remove surface oxides that would otherwise interfere with filler metal bonding.

Any Group IVb transitional metal or hydride may be used as the active metal or activating agent of this invention, such as titanium, zirconium, hafnium, thorium or hydrides or mixtures thereof. Of these, titanium, or zirconium hydrides or mixtures thereof are most preferred. Due to cost and availability, titanium hydride and titanium metal, in powder form, are the optimum choices. The particle size of the powder is not critical and can be routinely selected by one skilled in the art for the intended joining operation. These agents thus activate the oxides, carbides or nitrides of ceramic materials or on the surface of alloys or metals so that the filler metal can bond thereto.

The transition metal or hydride in powder form is relatively uniformly dispersed in a binder for application to the alloy strip. As noted above, the binder is preferably an organic material which, when heated to the brazing temperature, volatizes without substantially interfering with or contaminating the braze joint. The most preferred organic materials are thermoplastic polymers, such as the acrylic polymers. It is also possible to utilize as the binder polarmethacrylate polymers; elastomers (such as butyl, polyisobutylene or polyisoprene rubber or the like); polyacrylates; polystyrene; polyethylene oxide polymers; polyacrylonitrile; polyethylene glycols and alkyl (preferably methyl) ethers thereof; polyaliphatic hydrocarbons (such as paraffins, olefins, olefinic copolymers or mixtures thereof); cellulose and its derivatives; and natural gums or resins thereof.

In a preferred embodiment, a silver-copper eutectic alloy strip is coated with a mixture of titanium hydride powder in a solution of an acrylic polymer. A typical mixture for use in the present invention comprises about 50 weight percent titanium hydride and about 50 weight percent Acryloid F-10 (a 30 to 50% solution of an acrylic polymer in a solvent). The solvent is removed from the acrylic solution by heating so that a coating of titanium hydride and polymer remains on the strip. The acrylic polymer binds the titanium hydride securely to the eutectic alloy so that the coated alloy may be stamped and cut into appropriately shaped washers and discs conforming to the particular shape of the braze joint. The acrylic polymer utilized as the binder volatizes at temperatures above about 800° F., leaving little or no residue which does not interfere or contaminate the braze joint.

The present invention includes greater than 3 weight percent, and preferably greater than about 4 weight percent, and most preferably 6 weight percent titanium or more, based on the total weight of alloy and titanium hydride in the brazing material. As discussed above, ceramic brazing alloys of the past have been limited to about 2 to 3 weight percent titanium due to the detrimental effects of greater quantities of titanium upon the physical properties of the brazing material. As noted above, alloys utilizing titanium group active metals may only incorporate that amount before the blushing, decreased plasticity, and brittleness of the alloy adversely affects its performance. For use in coating aluminum or aluminum alloy articles, between about 4 and 9% of the titanium hydride should be used for optimum brazing results.

The availability of a sufficient amount of transition metal or hydride for reaction with an oxide or ceramic is directly related to the amount of interfacial compound which may form. It is the formation of the interfacial compound, as discussed above, that allows the alloying metals to adhere to the oxide or ceramic. It has been discovered that a higher concentration than 2 to 3% of titanium group active metals yields better quality, higher strength braze joints. Thus, the present invention utilizes greater than about 3 weight percent of titanium. so as to achieve a more substantial interfacial compound than heretofore possible from alloys incorporating titanium hydride therein. By utilizing an acrylic polymer to coat the alloy strip, an increased weight percentage of titanium hydride is provided so as to allow a substantially enhanced reaction with the ceramic component. This increased reaction results in increased braze joint strength.

The brazing material of the present invention is also capable of joining or coating most of the commonly used metals (i.e., iron, copper, nickel and alloys thereof including steel, stainless steel, nickel or copper base alloys, etc.) or other metals having a melting point which is lower than the brazing temperature of the filler metal; most oxide ceramics (i.e., alumina, silica, zirconia, etc.); most nitrides; most carbides; diamonds (synthetic or natural); graphite or carbon, and sapphire or like gemstones without the need for prior metallizing procedures. Due to its ability to wet the surface of oxide materials, such as ceramics, the present articles can be successfully used to join metals which form such oxides on their surfaces, such as aluminum or aluminum alloys together, when the appropriate filler material selected. For aluminum or aluminum alloys, an aluminum filler metal, such as the 718 alloy, should be used.

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

What is claimed is:

1. A brazing product comprising:
   a metal or alloy article of a filler material for forming a braze joint when heated to an appropriate brazing temperature; and
   a coating upon at least a portion of the article and comprising a Group IVb transition metal or transition metal hydride and a binder for retaining the transition metal or transition metal hydride upon the article when the coating is applied thereto.

2. The brazing product of claim 1 wherein the article is a flat strip and the coating is applied to one surface of the strip.

3. The brazing product of claim 2 wherein the flat strip is in the form of a disk or washer.

4. The brazing product of claim 1 wherein an alloy which includes at least two metals selected from the group consisting of silver, copper, gold, nickel, chromium, indium, aluminum or silicon is used as the filler material.

5. The brazing product of claim 1 wherein the transition metal or transition metal hydride includes titanium, zirconium or mixtures thereof.

6. The brazing product of claim 1 wherein the binder comprises an organic component which, when heated to the brazing temperature, volatizes without substantially interfering with or contaminating the braze joint.

7. The brazing product of claim 1 wherein the binder includes an acrylic polymer and the transition metal or hydride is in powder form.

8. The brazing material of claim 1 wherein the coating includes about 20 to 80 percent by weight of each of the binder and transition metal or hydride.

9. The brazing product of claim 1 wherein the transition metal or hydride is present in an amount of at least about 3 percent by weight of the article or greater.

10. A brazing product comprising:
a metal or alloy article of a filler metal of at least two metals for forming a braze joint when heated to an appropriate brazing temperature; and
a coating upon at least a portion of the article and comprising a Group IVb transition metal or hydride in powder form and present in an amount of greater than 3 weight percent based on the weight of the alloy article, and a binder of an organic component for retaining the transition metal or hydride upon the article when the coating is applied thereto, the transition metal or hydride powder dispersed substantially uniformly throughout the organic binder and being retained upon the alloy article by the coating, and the binder capable of volatizing when heated to the brazing temperature without substantially interfering with or contaminating the braze joint.

11. The brazing product of claim 10 wherein the article is a flat strip and the coating is applied to one surface of the strip 12. The brazing product of claim 11 wherein the flat strip is in the form of a disk or washer.

13. The brazing product of claim 12 wherein an alloy which includes at least two metals selected from the group consisting of silver, copper, gold, nickel, chromium, indium, aluminum or silicon is used.

14. The brazing product of claim 13 wherein the transition metal or transition metal hydride includes titanium, zirconium or mixtures thereof.

15. The brazing product of claim 14 wherein the binder includes an acrylic polymer and the transition metal or hydride is in powder form.

16. The brazing material of claim 15 wherein the coating includes about 20 to 80 percent by weight of each of the binder and transition metal or hydride.

17. The brazing product of claim 16 wherein the transition metal hydride is titanium hydride, zirconium hydride or mixtures thereof.

18. The brazing product of claim 17 wherein the hydride is present in an amount of 4 percent by weight of the article or greater.

* * * * *